(12) United States Patent
McClung et al.

(10) Patent No.: US 9,405,657 B2
(45) Date of Patent: Aug. 2, 2016

(54) APPLICATION ARCHITECTURE ASSESSMENT SYSTEM

(71) Applicant: Bank of America Corporation, Charlotte, NC (US)

(72) Inventors: Susan McClung, Charlotte, NC (US); David H. Middleton, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 144 days.

(21) Appl. No.: 14/513,836

(22) Filed: Oct. 14, 2014

(65) Prior Publication Data

US 2016/0103756 A1    Apr. 14, 2016

(51) Int. Cl.
  *G06F 11/00*   (2006.01)
  *G06F 11/36*   (2006.01)
  *G06F 11/07*   (2006.01)

(52) U.S. Cl.
  CPC ........ *G06F 11/3612* (2013.01); *G06F 11/0706* (2013.01); *G06F 11/079* (2013.01); *G06F 11/0751* (2013.01); *G06F 11/0793* (2013.01); *G06F 11/3604* (2013.01)

(58) Field of Classification Search
  CPC ............ G06F 11/3612; G06F 11/0706; G06F 11/0751; G06F 11/079; G06F 11/0793; G06F 11/36; G06F 11/3604; G06F 11/3616

USPC .................. 714/38.1, 25, 26, 33, 37, 45, 47.1
  See application file for complete search history.

(56) References Cited

U.S. PATENT DOCUMENTS

| | | | | |
|---|---|---|---|---|
| 5,815,654 | A * | 9/1998 | Bieda | G06F 11/3676 714/38.1 |
| 8,006,138 | B2 * | 8/2011 | Nir-Buchbinder | G06F 11/3616 714/38.1 |
| 8,990,637 | B1 * | 3/2015 | Vlachogiannis | G06F 9/542 714/47.1 |
| 2014/0237453 | A1 * | 8/2014 | Hulick, Jr. | G06F 11/3612 717/127 |

* cited by examiner

*Primary Examiner* — Joseph D Manoskey
(74) *Attorney, Agent, or Firm* — Michael A. Springs

(57) ABSTRACT

A system stores a plurality of chapters, a plurality of sections each associated with a chapter, a plurality of control points each associated with a section, a plurality of assessment points each associated with a control point, and a plurality of attributes each associated with an assessment point. The system retrieves application information corresponding to an application. The system determines that one of the plurality of stored attributes applies to the application and assigns an attribute score to the application based on the determination. The system calculates various scores based on the attribute score and other scores including, an assessment point score, a control point score, a section score, and a chapter score. Based at least in part upon at least one of these scores, the system determines a strength of the application.

20 Claims, 5 Drawing Sheets

APPLICATION ARCHITECTURE ASSESSMENT SYSTEM

TECHNICAL FIELD

This invention relates generally to technological assessments and more specifically, application architecture assessment.

BACKGROUND

Enterprises maintain various applications within its system for operational purposes. Applications receive periodic updates and new applications are introduced in the enterprise environment. Assessments of applications are currently limited.

SUMMARY

According to embodiments of the present disclosure, disadvantages and problems associated with application architecture assessment may be reduced or eliminated.

In certain embodiments, a system stores a plurality of chapters, a plurality of sections each associated with a chapter, a plurality of control points each associated with a section, a plurality of assessment points each associated with a control point, and a plurality of attributes each associated with an assessment point. The system retrieves application information corresponding to an application. The system determines that one of the plurality of stored attributes applies to the application and assigns an attribute score to the application based on the determination. The system calculates various scores based on the attribute score and other scores including, an assessment point score, a control point score, a section score, and a chapter score. Based at least in part upon at least one of these scores, the system determines a strength of the application.

Certain embodiments of the present disclosure may provide one or more technical advantages. In certain embodiments, a system for application assessment monitors a weak point of an application and determines whether a failure trigger occurs. This facilitates determining earlier that an application may fail and beginning to repair the application preemptively. This system thereby conserves the computational resources necessary to restore the application from failure because it is able to repair the application before any failure occurs, or repair the failure soon after it occurs.

In certain embodiments, a system for application assessment generates visualization data corresponding to the more unsatisfactory parts of an application that allow a user to readily identify the weakest points on an application or of an enterprise. This system conserves computational resources when comparing the weakest points in the application or the enterprise.

BRIEF DESCRIPTION OF THE DRAWINGS

For a more complete understanding of the present disclosure and its advantages, reference is made to the following descriptions, taken in conjunction with the accompanying drawings in which.

DETAILED DESCRIPTION

Embodiments of the present invention and its advantages are best understood by referring to FIGS. 1 through 4 of the drawings, like numerals being used for like and corresponding parts of the various drawings.

Enterprises and businesses contain various applications that facilitate serving their clients and/or customers and supporting internal operations of the enterprise. These applications may be created, changed, and/or updated to better serve clients and employees. After an enterprise uses an application for a period of time and the application's integration and inner workings have changed, it may be unclear how strong the application is, the weak points of the application, and whether an application failure may occur. The teachings of this disclosure recognize that it would be desirable to assess application architecture to determine the application's weak points to mitigate the risk of failure and to provide a proactive technique to restore an application in the event of a failure.

Figure 1:
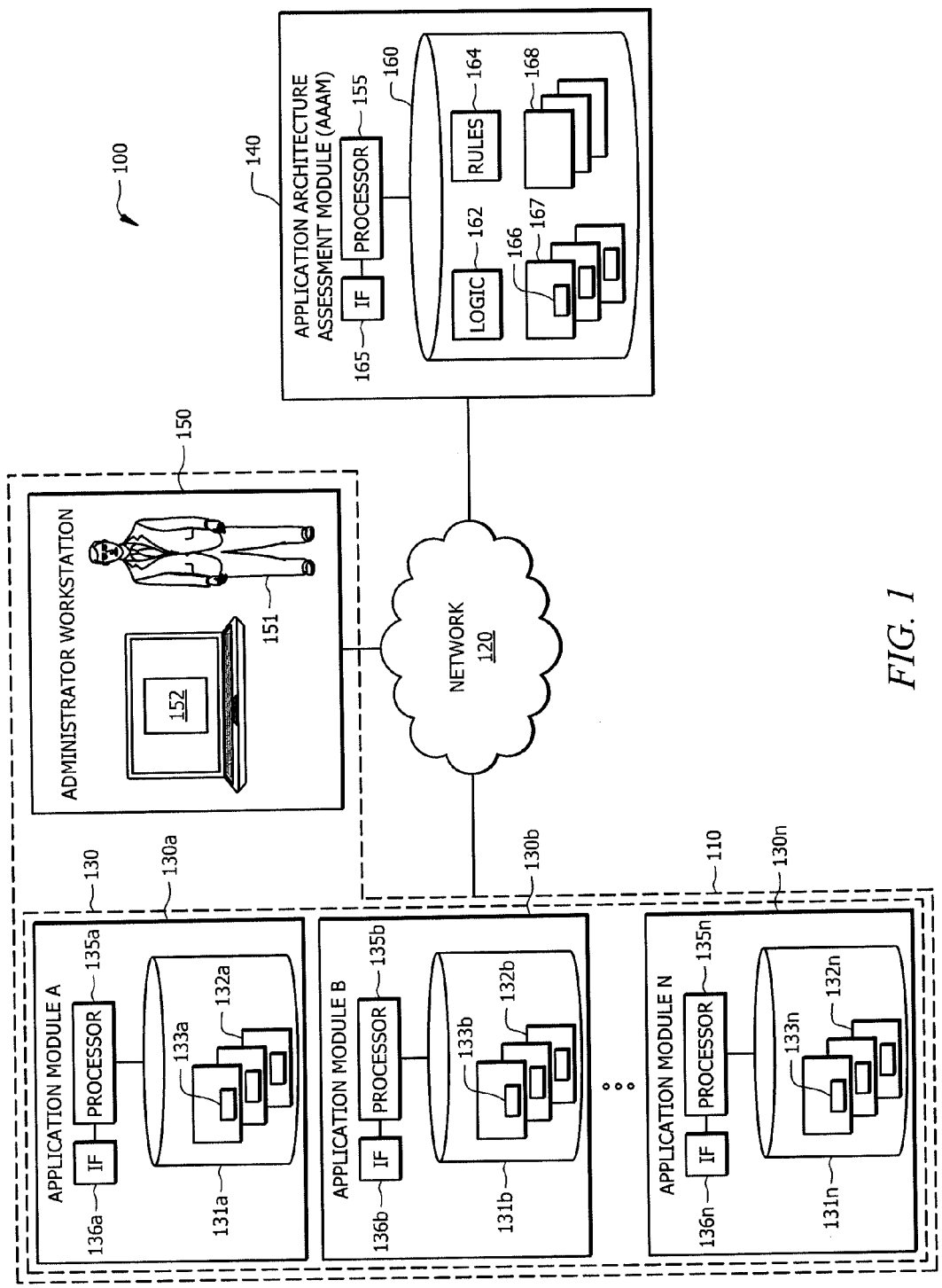
FIG. 1 illustrates an example system that facilitates application architecture assessment.

FIG. 1 illustrates a system 100 according to certain embodiments that facilitates application architecture assessment. System 100 may include enterprise 110, administrator workstation 150, one or more application modules 130, and one or more Application Architecture Assessment Modules (AAAM) 140. Enterprise 110, administrator workstation 150, and AAAM 140 may be communicatively coupled by network 120.

In general, AAAM 140 facilitates the assessment of various criteria related to applications in enterprise 110. AAAM 140 retrieves application information corresponding to an application, for example one of the one or more applications 132a in application module 130a. AAAM 140 determines one of the plurality of stored attributes applies to application 132 and assigns an attribute score to application 132 based on the determination. AAAM 140 calculates various scores based on the attribute score and other scores including, an assessment point score, a control point score, a section score, and a chapter score. Based at least in part upon at least one of these scores, AAAM 140 determines a strength of application 132.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. Network 120 may communicatively couple enterprise 110 with AAAM 140.

In some embodiments, administrator workstation 150 may refer to any device that facilitates administrator 151 performing a function in or interacting with system 100. In some embodiments, administrator workstation 150 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100.

In some embodiments, administrator workstation 150 may also comprise a graphical user interface (GUI) 152. GUI 152 is generally operable to tailor and filter data entered by and presented to administrator 151. GUI 152 may provide administrator 151 with an efficient and user-friendly presentation of heat map 201 and 202 and/or architecture artifact 301, as described below. GUI 152 may comprise a plurality of displays having interactive fields, pull-down lists, and buttons operated by administrator 151. GUI 152 may include multiple levels of abstraction including groupings and boundaries. It should be understood that the term GUI 152 may be used in the singular or in the plural to describe one or more GUIs 152 and each of the displays of a particular GUI 152. It will be understood that system 100 may comprise any number and combination of administrator workstations 150. Administrator 151 utilizes administrator workstation 150 to interact with AAAM 140 to input an attribute score and/or receive visualization of data such as a findings report, as described below.

Application module 130 represents any suitable components that maintain information and perform processing relating to applications within enterprise 110. Application module 130 may include an interface 136, a processor 135, and a memory 131. Memory 131 may contain one or more applications 132 that facilitate functions of enterprise 110. Examples of applications 132 may include an employee directory, an email system, a word processing system, a document management system, a money transfer application, and a customer rewards application. Application 132 may include one or more current attributes 133. Current attributes 133 may refer to any characteristic, quality, feature, or property of application 132. Each application 132 may include a plurality of current attributes 133. In some embodiments, enterprise 110 may include a large number of applications 132, such that enterprise 110 requires a plurality of application modules 130 to ensure applications 132 function correctly. For example, as shown in FIG. 1, enterprise 110 may include a first application module A 130*a*, a second application module B 130*b*, and any further number of application modules necessary as illustrated by application module N.

AAAM 140 may refer to any suitable combination of hardware and/or software implemented in one or more modules to process data and provide the described functions and operations. In some embodiments, the functions and operations described herein may be performed by a pool of AAAM 140. In some embodiments, AAAM 140 may include, for example, a mainframe, server, host computer, workstation, web server, file server, a personal computer such as a laptop, or any other suitable device operable to process data. In some embodiments, AAAM 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, AAAM 140 retrieves application information from application 132 of enterprise 110 to determine the strength of application 132, monitors any weak points of application 132 or enterprise 110, and implements operational procedures in the event of a potential or actual failure of application 132 or enterprise 110. Although shown in FIG. 1 as external to enterprise 110, it should be understood that AAAM 140 may be internal or external to enterprise 110. In some embodiments, AAAM 140 may include processor 155, memory 160, and interface 165.

Memory 160 may refer to any suitable device capable of storing and facilitating retrieval of data and/or instructions. Examples of memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates memory 160 as internal to AAAM 140, it should be understood that memory 160 may be internal or external to AAAM 140, depending on particular implementations. Also, memory 160 may be separate from or integral to other memory devices to achieve any suitable arrangement of memory devices for use in system 100.

Memory 160 is generally operable to store logic 162, rules 164, stored attributes 167 with corresponding attribute scores 166, and calculated scores 168. Logic 162 generally refers to algorithms, code, tables, and/or other suitable instructions for performing the described functions and operations. Rules 164 generally refer to policies or directions for determining whether one of the plurality of stored attributes 167 applies to application 132, calculating scores 168, and determining the strength of application 132 based on the calculated scores. Rules 164 may be predetermined or predefined, but may also be updated or amended based on the needs of enterprise 110. Stored attributes 167 may refer to any characteristic, quality, feature, or property that may apply to application 132. Memory 160 stores these stored attributes 167 so that AAAM 140 may compare stored attributes 167 to current attributes 133 of application 132 to determine whether one of the stored attributes 167 applies to application 132, as described below. Memory 160 also stores one or more attribute scores 166 associated with each stored attribute 167, as described below.

In some embodiments, memory 160 may also store stored scores 168 calculated by AAAM 140. For example, these calculated scores may be scores related to an assessment point, a control point, a section, and/or a chapter. In some embodiments, AAAM 140 stores a plurality of chapters, sections, control points, assessment points, and stored attributes 167 in memory 160 to facilitate application architecture assessment. For example, AAAM 140 stores a plurality of chapters, a plurality of sections each associated with a chapter, a plurality of control points each associated with a section, a plurality of assessment points each associated with a control point, and a plurality of attributes each associated with an assessment point. Chapters and sections represent different categories of assessment that AAAM 140 uses to determine the strength of application 132. A control point reflects a specific quality, capability, or management aspect of a system. An assessment point represents technology patterns, implementations, architecture best practice, and standards. AAAM 140 strategically measures where application 132 should be based on its unique obligations in its critical capabilities and position in enterprise 110. For example, the chapters used by AAAM 140 may include tier compliance, engineering, testing, and application management. Within a specific chapter, there are a plurality of sections, control points, assessment points, and attributes used to assess the strength of application 132. As an example, Table 1 shows example sections, control points, and assessment points for the "testing" chapter that measures how application 132 was tested before being implemented in enterprise 110. For example, the testing chapter may include four sections—Testability, Functional Testing, Performance Testing, and Resiliency Testing. Each section may contain a plurality of control points. For example, the Testability section may include three control points—Fault Creation, Testable Interfaces, and Testable architecture. Similarly, each control point may contain a plurality of assessment points. For example, the Testable Interfaces control point may include two assessment points—upstream/downstream application interface and user interface testability. In some embodiments, memory 160 may store the calculated scores 168 for AAAM 140 to generate a findings report or a heat map, compare the strength of applications 132a and 132b, and determine weak points of application 132.

TABLE 1

Example Sections, Control Points, and Assessment Points to be used in the Testing Chapter

| Section | Control Point | Assessment Point |
|---|---|---|
| Testability | Fault Creation | Fault Injection/Simulation and Detection |
|  | Testable Interfaces | Upstream/Downstream Application Interface |
|  |  | User Interface Testability |
|  | Testable architecture | Decomposition |
|  |  | Instrumentation |
| Functional Testing | Requirements/Scenario Based | Requirements |
|  |  | Scope and Quality of Define Test Cases |
|  |  | Data Distribution |
|  |  | Test Capability |
|  |  | Test Execution |
| Performance Testing | load/stress testing | Scope and Quality of Defined Test Cases |
|  |  | Test Capability |
|  |  | Test Execution |
|  |  | Test Environment |
|  | Saturation Testing | Test Capability |
|  |  | Test Execution |
|  |  | Test Environments |
|  |  | Interface Saturation |
|  |  | User Saturation |
| Resiliency Testing | Requirements | Non-Functional Requirements |
|  | Application Recovery | Local Recovery |
|  |  | Disaster Recovery |
|  | Data Recovery | Restore Data from Online Backup or Copy |
|  |  | Restore Data from Offline Backup |

In certain embodiments, each assessment point contains a plurality of stored attributes 167, which indicates the level of the assessment point that application 132 reaches. For example, the assessment point "user interface testability" may include six attributes—not tested, automation not available, automated, integrated, load and stress capable, or other. Table 2 shows example attributes associated with various assessment points under the "testing" chapter.

TABLE 2

Example Attributes for Testing Chapter

| Section | Control Point | Assessment Point | Attributes |
|---|---|---|---|
| Testability | Fault Creation | Fault Injection/Simulation and Detection | not tested |
|  |  |  | none |
|  |  |  | limited |
|  |  |  | extensive external conditions |
|  |  |  | extensive internal conditions |
|  |  |  | other |
|  | Testable Interfaces | Upstream/Down stream Application Interface | not IP based |
|  |  |  | proprietary protocol |
|  |  |  | overly complex interfaces |
|  |  |  | common protocol & easy to emulate |
|  |  |  | other |

TABLE 2-continued

Example Attributes for Testing Chapter

| Section | Control Point | Assessment Point | Attributes |
|---|---|---|---|
|  |  | User Interface Testability | not tested |
|  |  |  | automation not available |
|  |  |  | automated |
|  |  |  | integrated |
|  |  |  | load & stress capable |
|  |  |  | other |
|  | Testable architecture | Decomposition | blackbox only |
|  |  |  | functional ID only |
|  |  |  | documented, non-standard protocol(s) |
|  |  |  | documented, standard protocol(s) |
|  |  |  | other |
|  |  | Instrumentation | not tested |
|  |  |  | no/limited view of performance metrics |
|  |  |  | minimal performance metrics |
|  |  |  | full performance metrics |
|  |  |  | other |

Memory 160 communicatively couples to processor 155. Processor 155 is generally operable to execute logic 162 stored in memory 160 to determine a strength of application 132, according to the disclosure. Processor 155 may comprise any suitable combination of hardware and software implemented in one or more modules to execute instructions and manipulate data to perform the described functions for AAAM 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for AAAM 140, send output from AAAM 140, perform suitable processing of the input or output or both, communicate to other devices, or any combination of the preceding. Communication interface 165 may include appropriate hardware (e.g. modem, network interface card, etc.) and software, including protocol conversion and data processing capabilities, to communicate through network 120 or other communication system that allows AAAM 140 to communicate to other devices. Communication interface 165 may include any suitable software operable to access data from various devices such as administrator workstation 150 and/or application modules 130. Communication interface 165 may also include any suitable software operable to transmit data to various devices such as administrator workstation 150. Communication interface 165 may include one or more ports, conversion software, or both. In general, communication interface 165 may retrieve application information, such as current attributes 133, corresponding to application 132 and may send information to administrator workstation 150, such as findings reports, architecture artifacts, calculated scores 168, and alerts regarding trigger failures.

In operation, logic 162 and rules 164, upon execution by processor 155, facilitate determining whether one of the plurality of stored attributes 167 applies to application 132, calculating scores 168, and determining the strength of application 132 based on the calculated scores. Logic 162 and rules 164 also facilitate determining one or more weak points of application 132, determining an enhanced operational procedure to facilitate repairing application 132, monitoring at least one weak point of application 132, determining that a failure trigger occurs in application 132, and in response, performing an enhanced operational procedure to repair application 132. Logic 162 and rules 164 may also facilitate comparing the strength of one or more applications 132, such as application 132a to application 132b, to determine a failure point in enterprise 110.

In some embodiments, AAAM 140 retrieves application information regarding application 132, including current attributes 133 of application 132. AAAM 140 may then determine whether any of the stored attributes 167 apply to application 132. AAAM 140 may compare the current attributes 133 to stored attributes 167 to determine whether one of the stored attributes 167 applies to application 132. For example, AAAM 140 may analyze current attributes 133 of application 132 to determine that the user interface (assessment point) of application 132 is automated (attribute). In some embodiments, stored attributes 167 are associated with attribute scores 166. For example, the scores associated with user interface testability may be: not tested (−10), automation not available (0), automated (1), integrated (2), and load and stress capable (2). Continuing the example above, if AAAM 140 determines that the user interface of application 132 is automated, it will assign an attribute score of 1 to application 132.

In some embodiments, AAAM 140 may determine that multiple attributes apply to application 132 and may assign a plurality of attribute scores to application 132. For example, if AAAM 140 also determines that the user interface of application is load and stress capable, it will assign an attribute score of 2 in addition to the attribute score of 1 for the user interface of application 132 being automated. In some embodiments, AAAM 140 may determine that an attribute is not applicable to application 132. For example, if AAAM 140 determines that the user interface of application 132 was tested, it would not assign the attribute "not tested" an attribute score, but rather would assign it no score or designate that attribute "not applicable." In some embodiments, AAAM 140 repeats this process by determining whether each attribute applies to application 132, resulting in a plurality of attribute scores. For example, AAAM 140 may compare current attributes 133 of application 132 to each stored attribute 165 that is listed in Table 1, resulting in either an attribute score or a "not applicable" designation for each attribute listed. In some embodiments, AAAM 140 repeats the process for every attribute under each assessment point for all of the chapters, sections, and control points.

In some embodiments, AAAM 140 calculates an assessment point score based at least in part upon the attribute score. AAAM 140 may calculate the assessment point score through summation or averaging the one or more attribute scores. For example, AAAM 140 may determine for the user interface testability assessment point that the following attributes and scores apply: automation (0), integrated (2), and load and stress capable (2), while "not tested" and "automated" are not applicable. Continuing the example, AAAM 140 may determine the assessment point score for user interface testability is 4 (for summation) or 1.33 (for averages). AAAM 140 may calculate a plurality of assessment point scores for each control point.

In some embodiments, AAAM 140 calculates a control point score based at least in part upon the assessment point score. AAAM 140 may calculate the control score through averaging the one or more assessment point scores. For example, if AAAM 140 determines the assessment point score for user interface testability is 4 and the assessment point score for upstream/downstream application interface is 7.5, then AAAM 140 may determine the control point score for testable interfaces is 5.75. Similarly, AAAM 140 may calculate a section score by aggregating the plurality of control point scores and may calculate a chapter score by aggregating the plurality of section scores. In some embodiments, AAAM 140 stores these calculated scores 168 in memory 160 for other use. For example, AAAM 140 may use these stored calculated scores 168 to determine the strength of application 162, compare the strength of application 162a to application 162b, generate a findings report, generate a heat map, and/or perform some other data assessment and/or manipulation.

In some embodiments, AAAM 140 determines a strength of application 132 based at least in part upon at least one of the assessment point score, the control point score, the section score, and the chapter score. AAAM 140 may determine the strength of application 132 by comparing the scores to predetermined thresholds. For example, if the chapter score for Testing is 3.4 and the threshold score is 3, AAAM 140 may determine the Testing of application 132 is satisfactory. As another example, if the control point score for Testable Architecture is 2.2 and the threshold is 3.5, AAAM 140 may determine the Testable Architecture for application 132 is unsatisfactory.

AAAM 140, in certain embodiments, may also determine one or more weak points of application 132 based at least in part upon at least one of the assessment point score, the control point score, the section score, and the chapter score. A weak point may be any aspect or part of application 132 that is insufficient by industry standards or that may cause any issues for or failure of application 132. A low score may be indicative of a weak point of application 132. For example, if the assessment point score for the assessment point "Upstream/Downstream Application Interface" is a 0.5, that may be a low score, which would indicate a weak point of application 132. In some embodiments, AAAM 140 may look at a plurality of different scores. For example, if the chapter score for testability is high (e.g., 4) and showing as satisfactory, there may be one assessment point of application 132 which is low and in danger of failure. By analyzing the weak points even though the overall scores are high, AAAM 140 may be able to identify any possibility of failure before it occurs. In certain embodiments, AAAM 140 may further determine an enhanced operational procedure to facilitate repairing the first application in the event of a failure. For example, if AAAM 140 determines a weak point in application 132, it may prepare for a failure by creating these operation procedures to limit the amount of time it takes to get application 132 up and running again in the event of a failure.

In some embodiments, AAAM 140 may monitor at least one of the weak points of application 132. For example, if AAAM 140 determines that the Fault Injection/Simulation and Detection was not tested and thus has a low score, then AAAM 140 may set up monitoring on this aspect of application 132. Continuing the example, if application 132 shows any sign of further weakness or indication of failure, AAAM 140 may be alerted sooner than if the monitoring had not been put in place. In some embodiments, AAAM 140 may determine that a failure trigger occurs in application 132. This determination may be as a result of the monitoring or through some other analysis of application 132. In response to the determination that the failure trigger occurs, in some embodiments, AAAM 140 may perform the enhanced operational procedures that it previously determined. These operational procedures may facilitate limiting the amount of time application 132 is not functioning or may preempt any failure of application 132.

In some embodiments, AAAM 140 may use calculated scores 168 to compare the strength of applications 132 against each other. AAAM 140 may compare two applications 132 against each other (e.g., application 132a and 132b), may compare all applications 132 in one application module (e.g., applications 132a in application module A 130a), or may even compare all applications 132 within enterprise 110 (e.g., applications 132a, 132b, 132c, 132d . . . 132n). Comparing applications 132 may comprise comparing the various calculated scores 168 against each other (e.g., the control point score for Testable Architecture in application 132a and the control point score for Testable Architecture in application 132b), comparing the satisfactory or unsatisfactory determination between applications 132a and 132b, or determining the weakest point (e.g., the lowest assessment point score) across all applications 132 in enterprise 110. Based on this comparison, AAAM 140 determines a failure point in enterprise 110 in certain embodiments. For example, AAAM 140 may determine the failure point within one application module 130, within a certain unit of business, or within enterprise 110 as a whole. By determining this failure point, AAAM 140 may take a series of options such as: (1) remediating and repairing application 132 that includes the weak point, (2) setting up monitoring on the weak point to preempt or prevent any failure, (3) alert administrator 151, and/or (4) determine operation procedures to facilitate repairing application 132 in the event of a failure or a failure trigger.

AAAM 140, in some embodiments, identifies other applications that application 132 interacts with. AAAM 140 may identify these other applications based on application information received from application 132. For example, AAAM 140 may retrieve application information from application 132a and 132b and determine how these two applications interact with each other, if at all. Further, AAAM 140 may determine an integration of application 132a within enterprise 110. AAAM 140 may make this determination, for example, by retrieving application information from all applications in the same application module 130 as application 132a or by analyzing application information from application 132a itself. Using the identified other applications and the determined integration, AAAM 140 may generate an architecture artifact to illustrate the integration of the first application within enterprise 110. An example of an architecture artifact is explained below with reference to FIG. 2.

In some embodiments, AAAM 140 determines the strength and one or more weak points of application 132 and generates a findings report. The findings report may include any information relevant to the assessment of application 132. For example, the findings report may include any of the calculated scores 168 (e.g., attribute scores, assessment point scores, control point scores, section scores, chapter scores), the strength of application 132 (e.g., maturity level, satisfactory or unsatisfactory, above or below a predetermined threshold), the weak points of application 132 along with any proposed solution (e.g., remediation, operational procedures to put in place, monitoring to implement, a recommendation roadmap with a corresponding timeframe for fixing application 132), a summary of the purpose of application 132, one or more architectural artifacts illustrating application 132's integration in enterprise 110, and one or more heat maps based on calculated scores 168. AAAM 140 may send the findings report to administrator 151 at administrator workstation 150 for display on GUI 152.

In an example embodiment of operation, AAAM 140 retrieves application information corresponding to one or more applications 132 and determines whether one of the plurality of stored attributes 167 corresponds to current attributes 133 of application 132. AAAM 140 may assign a score to attribute 165 based on this determination and may repeat the process for a plurality of stored attributes 167 that may be applicable to application 132. AAAM 140 may also calculate scores 168, including assessment point scores, control point scores, section scores, and chapter scores that AAAM 140 can use to determine the strength and/or one or more weak points of application 132. In some embodiments, AAAM 140 may determine enhanced operational procedures to facilitate repairing application 132 and monitoring the one or more weak points of application 132. If a failure trigger occurs in application 132, AAAM 140 may, in some embodiments, perform the enhanced operational procedure to repair application 132 and/or prevent a failure from occurring. In some embodiments, AAAM 140 may use calculated scores 168 and application information to generate illustrations regarding the architecture assessment of application 132, such as a findings report, a heat map, and/or an architecture artifact. AAAM 140 may communicate some or all of these illustrations to administrator 151 for display on GUI 152.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of application modules 130, applications 132, current attributes 133, networks 120, administrator workstations 150, and AAAMs 140. As another example, particular functions, such as calculating some of the scores (e.g., control point scores, attribute scores), may be performed by a separate component and AAAM 140 receives the information regarding the scores. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Figure 2A:
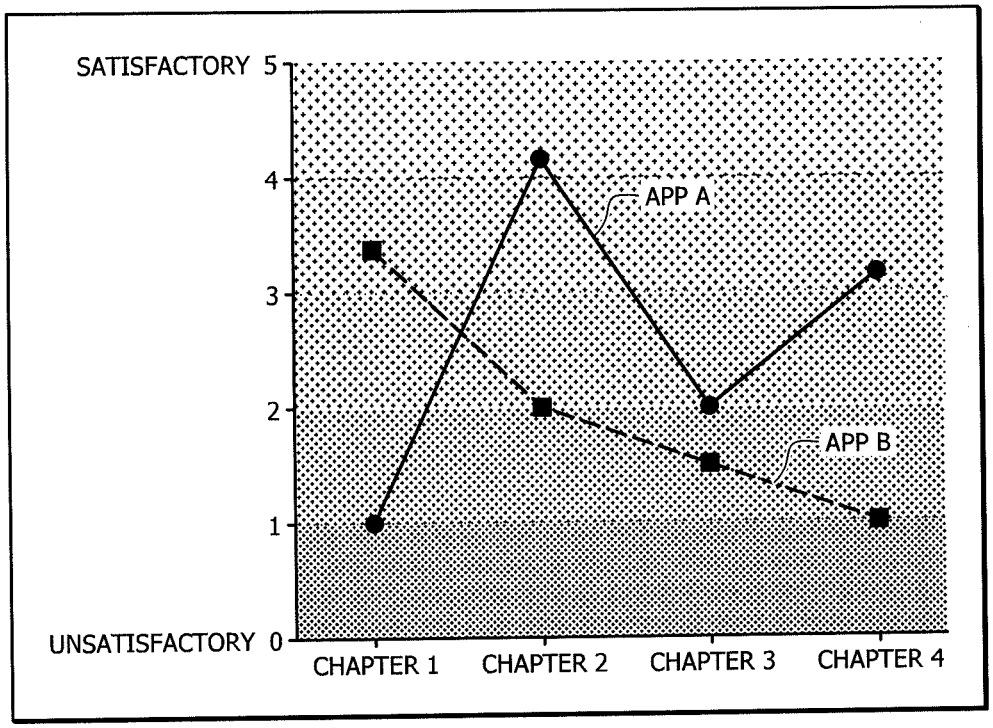
FIGS. 2A and 2B illustrate an example data visualization in the form of a heat map corresponding to the plurality of chapter scores.
Figure 2B:
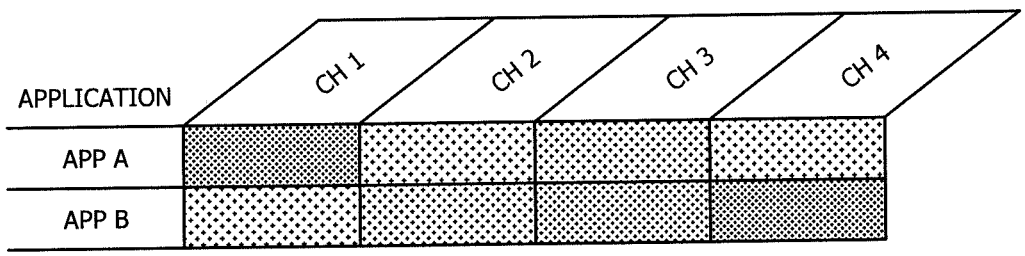

FIGS. 2A and 2B illustrate an example data visualization in the form of a heat map corresponding to the composite scores from the assessment. FIG. 2A shows an example heat map of the chapter scores for two applications, Application A and Application B. The chapter scores for Application A are plotted with a circle and connected by a straight line, while the chapter scores for Application B are plotted with a square and connected by a dotted line. The chapter scores for each application are plotted to show whether those chapter scores are in the range of being unsatisfactory with the lower score or satisfactory with a higher score. FIG. 2A also represents the shading of the scores with the darker shading being in the unsatisfactory range and the lighter shading being in the satisfactory range. FIG. 2B shows the results of plotting in FIG. 2A, specifically it shows the shading for each chapter score, which represents whether that chapter characteristic is satisfactory or unsatisfactory. For example, chapter score 1 for application A in FIG. 2A is plotted at 1, which is in the darker shade shading, and the more unsatisfactory range. FIG. 2B shows the darker range in the chapter 1 box, which may inform administrator 151 that the chapter score for Application A in Chapter 1 is low and unsatisfactory. FIG. 2B can be generated by AAAM 140 so that a user or administrator 151 may visually determine the application and application chapters with the most unsatisfactory scores based on the shading. For example, FIG. 2B shows chapter 1 of Application A and chapter 4 of Application B as being the darkest shading, and thus the lowest scores and most unsatisfactory. FIG. 2B also shows chapter 1 of Application B and chapter 2 and chapter 4 of Application A with the lightest shading, thus the highest scores and the most satisfactory. In general, a heat map may be generated by AAAM 140 and sent to administrator work station 150 via network 120 from interface 165 in order to be displayed on GUI 152.

Modifications, additions, or omissions may be made to the systems described herein without departing from the scope of the invention. For example, although FIG. 2 illustrates the heat map representing the chapter scores for two applications, it should be understood that it can represent any calculated score (e.g., control point score, section score, assessment point score) and any number of applications (e.g., one, ten, all applications 132 in one application module 130, or all applications 132 within enterprise 110). The components of AAAM 140 that generate the heat map may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Figure 3:
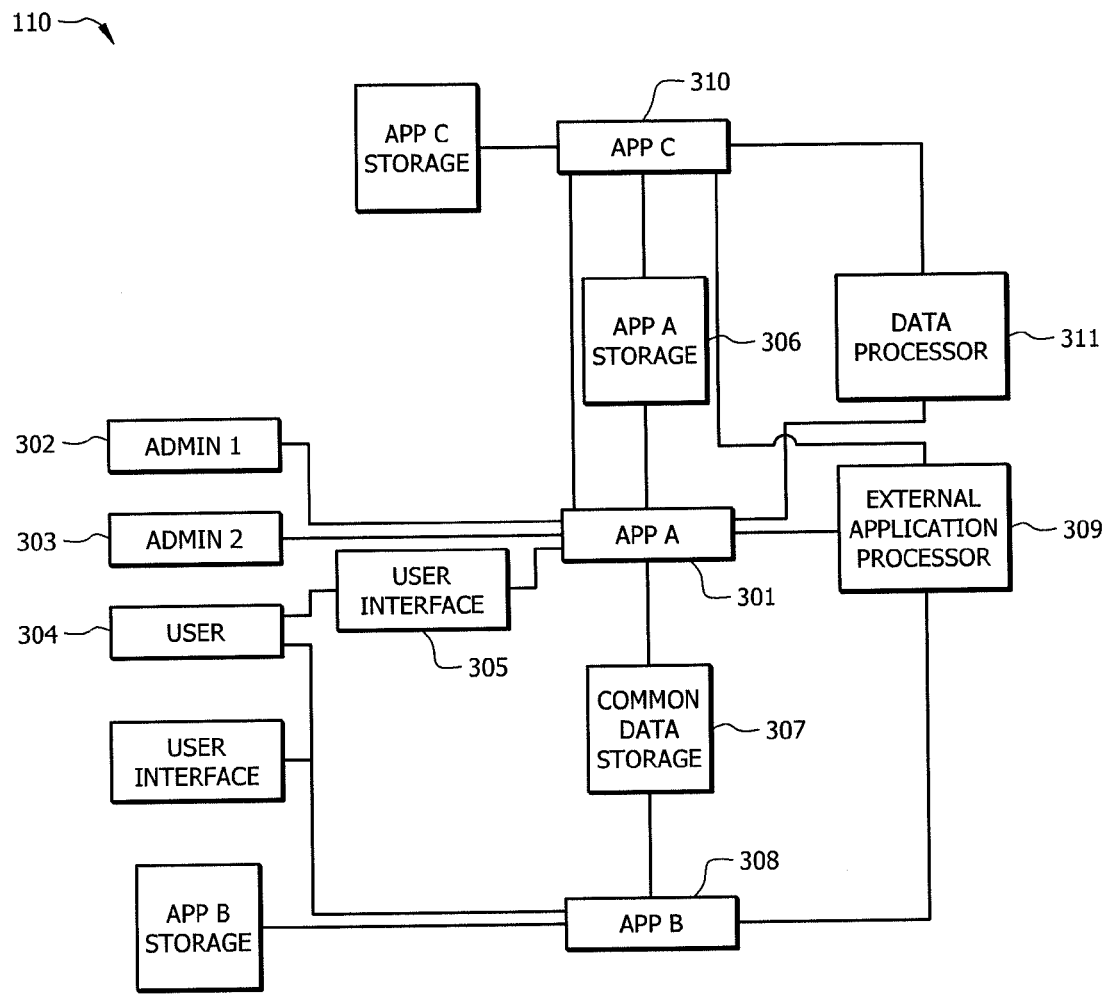
FIG. 3 illustrates an example architecture artifact comprising information corresponding to the integration of the application within the enterprise.

FIG. 3 illustrates an example architecture artifact comprising information corresponding to the integration of the application within the enterprise. Specifically, FIG. 3 illustrates the integration of Application A within enterprise 110. For example, Application A, shown at the center of FIG. 3 in box 301, is connected to and accessible by admin 1 in box 302, admin 2 in box 303, a user in box 304, and user interface in box 305. FIG. 3 also shows the aspects of enterprise 110 that Application A 301 can access. For example, Application A 301 can access: Application A storage in box 306, common data storage in box 307 (which is shared by Application B in box 308), external application processor in box 309 (which is also shared by Application B in box 308 and Application C in box 310), and data processor in box 311 (which is also shared and accessible by Application C in box 310). This example architecture artifact shows the integration of Application A within enterprise 110, and shows in particular how many sources can access it and how many sources to which it has access. In some embodiments, AAAM 140 may generate the architecture artifact, such as the one illustrated in FIG. 3, and send to administrator work station 150 via network 120 from interface 165 for display to administrator 151 on GUI 152. An architecture artifact in general represents data visualization of application information for application 132 such that administrator 151 can visually determine the integration of Application A within enterprise 110.

Modifications, additions, or omissions may be made to the systems described herein without departing from the scope of the invention. For example, although FIG. 3 illustrates the architecture artifact for Application A, it should be understood that an architecture artifact may be illustrated for one or more applications, or even all the applications 132 in enterprise 110. The components of AAAM 140 that generate the architecture artifact may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Figure 4A:
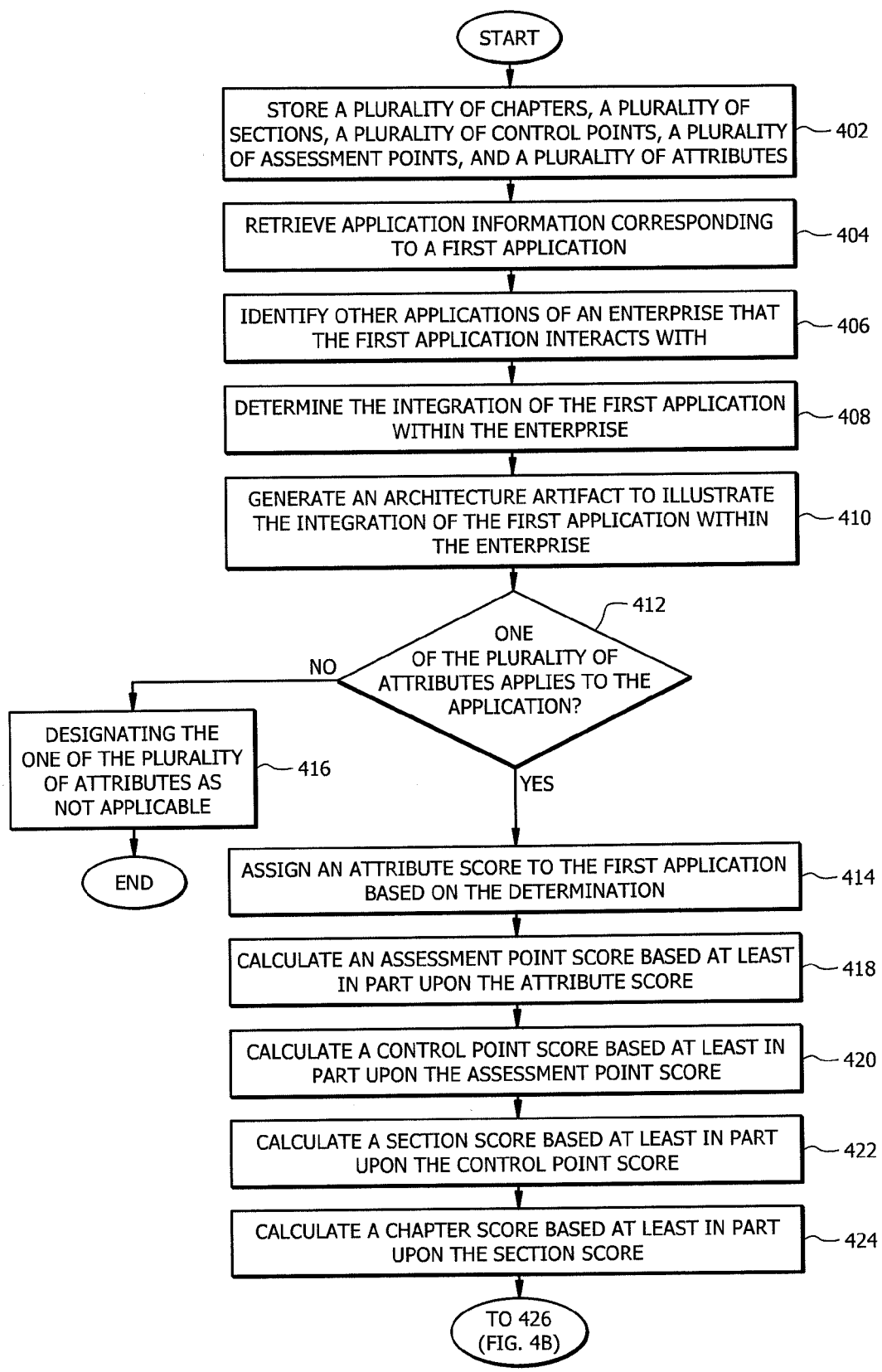
FIGS. 4A and 4B illustrate an example flowchart for facilitating application architecture assessment.
Figure 4B:
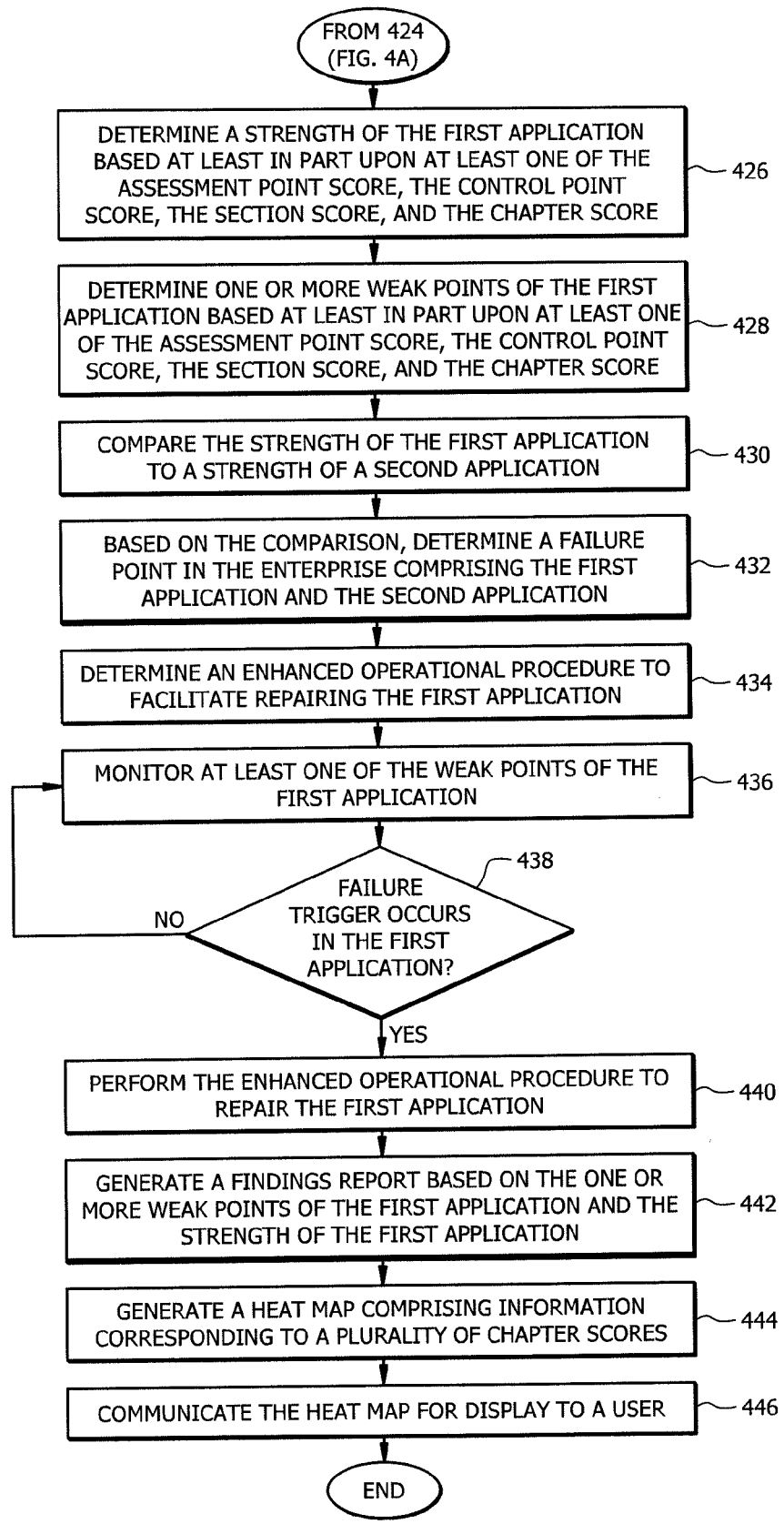

FIGS. 4A and 4B illustrate an example flowchart for facilitating application architecture assessment. The method begins at step 402 and AAAM 140, in some embodiments, stores a plurality of chapters, plurality of sections each associated with a chapter, a plurality of control points each associated with a section, a plurality of assessment points each associated with a control point, and a plurality of attributes each associated with an assessment point. AAAM 140 may store each piece of data in memory 150.

At step 404, in some embodiments, AAAM 140 retrieves application information corresponding to application 132 of enterprise 110. Application information may include current attributes 133 of application 132. Using the application information, at step 406, in some embodiments, AAAM 140 may identify other applications of enterprise 110 that application 132 interacts with. AAAM 140 may also retrieve application information (e.g., current attributes 133) of these other applications that application 132 interacts with. This identification may assist AAAM 140 in determining the integration of application 132 within enterprise 110 at step 408. For example, AAAM 140 may determine that application 132a interacts with application 132b and determine that application 132a and application 132b share a common data source. This example is illustrated in FIG. 3 by showing Application A in box 301 and Application B in box 308 sharing common data storage in box 307.

Using the application information from application 132 retrieved at step 404, the identification of other applications that interact with application 132 at step 406, and the determined integration of application 132 within enterprise 110 at step 408, allows AAAM 140, in some embodiments, to generate an architecture artifact to illustrate the integration of application 132 within enterprise 110 at step 410. An example of an architecture artifact is shown in FIG. 3 and explained above. AAAM 140 may send the illustrated architecture artifact to administrator 151 so that administrator 151 may easily discern the integration of application 132 within enterprise 110.

At step 412, in some embodiments, AAAM 140 determines whether one of the plurality of stored attributes 167 applies to application 132. AAAM 140 may compare current attributes 133 of application 132 to stored attributes 167 in memory 160 to facilitate making this determination. If AAAM 140 determines that one of the plurality of attributes 155 does not apply, AAAM 140 continues to step 416 and designates that the attribute 165 is not applicable. For example, under the engineering chapter, performance section, the performance management control point and the workload management assessment point, AAAM 140 may look at the attribute entitled "Process Priority" and compare it to current attributes 133 of application 132. Continuing the example, AAAM 140 may determine that this process priority attribute is not applicable because process priority is not used and has not been tested as a viable means of managing workload in application 132. After designating that this attribute is not applicable, the method ends. If in step 412 AAAM 140 determines that the attribute 165 applies to application 132, then the method continues to step 414 and AAAM 140 assigns an attribute score to application 132 based on the determination. For example, if AAAM 140 determines that the workload management in application 132 is prioritized at the startup of application 132 (e.g., work stream priorities set the astatic configuration), then AAAM 140 may assign the attribute score (e.g., a score of 2) for the "prioritization at startup" attribute.

At step 418, AAAM 140 calculates an assessment point score based at least in part upon the attribute score. AAAM 140 may calculate the assessment point score based on one attribute score or a plurality of attribute scores. For example, if AAAM 140 has five attribute scores in the "workload management" assessment point, then AAAM 140 may calculate the assessment point score for "workload management" based on all five of those attribute scores or any fewer number of those attribute scores. At step 420 in some embodiments, AAAM 140 calculates the control point score based at least in part upon the assessment point score. Similarly, the control point score may be calculated from one or more assessment point scores calculated by AAAM 140. At step 422, in some embodiments, AAAM 140 calculates a section score based at least in part upon the control point score. The section score may be based on a plurality of control point scores. For example, if one section under the "engineering" chapter is the "resiliency" section, the section score may be based upon the one or more of the control point scores from the control points "geographic resiliency," "local resiliency," "downstream outage tolerance," "data resiliency" and "fragility." At step 424, in some embodiments, AAAM 140 calculates the chapter score based at least in part on the section scores. For example, the chapter score for "engineering" may be based on the section scores for the sections "performance resiliency," "security," "integration," and "storage."

At step 426, in some embodiments, AAAM 140 determines a strength of application 132 based at least in part upon at least one of the assessment point scores, control point scores, section scores, and chapter scores. At step 428 in some embodiments, AAAM 140 may determine one or more weak points of application 132 based at least in part upon at least one of the assessment point scores, the control point scores, the section score and the chapter score. For example the section score of the "storage" section within the "engineering" chapter may be a high and satisfactory score of 4, but it may have a weak point (e.g., low score of 1.3) at the "performance management" control point within the "performance" section. AAAM 140 may need to determine the weak point exists to determine whether failure based on the performance management is likely.

At step 430, in some embodiments, AAAM 140 may compare the strength of a first application (e.g., 132a) to the strength of a second application (e.g., 132b). AAAM 140 may compare the strength by comparing a plurality of aspects, for example: the satisfactory versus unsatisfactory aspects of each application 132, the specific chapter scores, the specific section scores, or the specific assessment point scores. Data visualization may be useful in comparing the strength of two or more applications, such as FIG. 2B that illustrates a heat map showing the satisfactory and unsatisfactory aspects of each chapter. At step 432, in some embodiments, AAAM 140, based on the comparison of strength, may determine a failure point in enterprise 110 that comprises application 132a and 132b. For example, even though each application 132 may have strong and satisfactory chapter scores, by assessing the total strength and comparing the strengths, AAAM 140 may determine a weak point in application 132b that affects application 132a as well as the entire enterprise 110, which may cause failure of a particular business unit in enterprise 110.

At step 434, in some embodiments, AAAM 140 may determine an enhanced operational procedure to facilitate repairing application 132a. For example, if AAAM 140 determines the failure point is within application 132a based on the low assessment point score of the "response time" assessment point, then AAAM 140 may determine how to best repair application 132a. AAAM 140 may also determine future procedures to repair the application only in the event that a failure trigger occurs (explained below at step 438). At step 436, in some embodiments, AAAM 140, may monitor at least one of the weak points of application 132. If AAAM 140 cannot immediately repair application 132 or administrator 151 does not want AAAM 140 to repair application 132 immediately, the monitoring at step 436 may be able to prevent failure by monitoring the weak point. AAAM 140 may be able to alert enterprise 110 and/or administrator 151 before a failure occurs.

At step 438, in some embodiments, AAAM 140 determines whether a failure trigger occurred in application 132. This is often determined based on monitoring the weak points of application 132 in step 436. If AAAM 140 determines that the failure trigger did not occur, it repeats step 436 and continues to monitor the weak points of application 132. If at step 438 AAAM 140 determines the failure trigger occurred, AAAM 140, in some embodiments, at step 440 performs the enhanced operational procedures to repair application 132. These enhanced operational procedures may be those procedures determined by AAAM 140 at step 434, but not immediately carried out.

At step 442, in some embodiments, AAAM may generate a findings report based on the one or more weak points of application 132 and the strengths of application 132. The weak points may be those determined at step 428 and the strengths may be those determined at step 426 by AAAM 140. The findings report includes any data that may be valuable for administrator 151 in assessing the strength and/or weakness of one or more applications 132 as well as any failure points of the enterprise 110. The findings report may include any type of information regarding the architecture assessment, including: (1) application information retrieved by AAAM 140 at step 404, (2) any number of calculated scores 168 that may be calculated in steps 418 through 424 by AAAM 140, (3) an architectural assessment generated at step 410 by AAAM 140 and illustrated in FIG. 3 and (4) a comparison of the strengths of one or more applications 132 against each other. The findings report generated by AAAM 140 may be sent to administrator 151 from interface 165 to administrator work station 150 via network 120 and the findings report may be displayed on GUI 152.

At step 444, in some embodiments, AAAM 140 generates a heat map comprising information corresponding to a plurality of scores. An example heat map is illustrated in FIGS. 2A and 2B. At step 446, in some embodiments, AAAM 140 communicates the heat map for display on GUI 152 to administrator 151. AAAM 140 may communicate the heat map from interface 165 to administrator work station 150 via network 120. The heat map may be useful to administrator 151 to readily determine the weakest point of application 132 and/or may visually determine the comparison of strong and weak points between one or more applications 132. After communicating the heat map at step 446, the method ends.

Modifications, additions, or omissions may be made to the methods described herein without departing from the scope of the invention. For example, the steps may be combined, modified, or deleted where appropriate, and additional steps may be added. In an embodiment where AAAM 140 determines one or more weak points of application 132 at step 428, the method may omit step 426 of determining the strength of the application. As another example, steps 434-440 may be omitted if the assessment is only meant to inform administrator 151 of the strength of application 132 rather than attempting to fix and/or monitor the weak points of application 132. Additionally, the steps may be performed in any suitable order without departing from the scope of the present disclosure. While discussed as AAAM 140 performing the steps, any suitable component of system 100 may perform one or more steps of the method.

Certain embodiments of the present disclosure may provide one or more technical advantages. In certain embodiments, a system for application assessment monitors a weak point of an application and determines whether a failure trigger occurs. This facilitates determining earlier that an application may fail and beginning to repair the application preemptively. This system thereby conserves the computational resources necessary to restore the application from failure because it is able to repair the application before any failure occurs, or repair the failure soon after it occurs.

In certain embodiments, a system for application assessment generates visualization data corresponding to the more unsatisfactory parts of an application that allow a user to readily identify the weakest points on an application or of an enterprise. This system conserves computational resources when comparing the weakest points in the application or the enterprise.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for application assessment, comprising:
    a memory operable to store a plurality of chapters, a plurality of sections each associated with a chapter, a plurality of control points each associated with a section, a plurality of assessment points each associated with a control point, and a plurality of attributes each associated with an assessment point;
    an interface operable to retrieve application information corresponding to a first application;
    a processor communicatively coupled to the memory and the interface and operable to:
        determine whether one of the plurality of attributes applies to the first application;
        assign an attribute score to the first application based on the determination;
        calculate an assessment point score based at least in part upon the attribute score;
        calculate a control point score based at least in part upon the assessment point score;
        calculate a section score based at least in part upon the control point score;
        calculate a chapter score based at least in part upon the section score; and
        determine a strength of the first application based at least in part upon at least one of the assessment point score, the control point score, the section score, and the chapter score.

2. The system of claim 1, the one or more processors further operable to:
    determine one or more weak points of the first application based at least in part upon at least one of the assessment point score, the control point score, the section score, and the chapter score;
    determine enhanced operational procedures to facilitate repairing the first application;
    monitor at least one of the weak points of the first application;
    determine that a failure trigger occurs in the first application; and
    in response to determining that the failure trigger occurs, perform the enhanced operational procedures to repair the first application.

3. The system of claim 1, the one or more processors further operable to:
    compare the strength of the first application to a strength of a second application; and
    determine a failure point in an enterprise comprising the first application and the second application based on the comparison.

4. The system of claim 1, the one or more processors further operable to:
    identify other applications of an enterprise that the first application interacts with;
    determine an integration of the first application within the enterprise; and
    generate an architecture artifact to illustrate the integration of the first application within the enterprise.

5. The system of claim 1, wherein:
    the one or more processors are further operable to generate a heat map comprising information corresponding to a plurality of chapter scores; and
    the interface is further operable to communicate the heat map for display to a user.

6. The system of claim 1, wherein:
    determining whether one of the plurality of attributes applies to the application comprises determining one of the plurality of attributes is not applicable to the application; and
    assigning an attribute score to the application comprises designating the one of the plurality of attributes as not applicable.

7. The system of claim 1, wherein the one or more processors are further operable to:
    determine one or more weak points of the first application based at least in part upon at least one of the assessment point score, the control point score, the section score, and the chapter score; and
    generate a findings report based on the one or more weak points of the first application and the strength of the first application.

8. A non-transitory computer readable storage medium comprising logic, the logic, when executed by a processor, operable to:
    store a plurality of chapters, a plurality of sections each associated with a chapter, a plurality of control points each associated with a section, a plurality of assessment points each associated with a control point, and a plurality of attributes each associated with an assessment point;
    retrieve application information corresponding to a first application;
    determine whether one of the plurality of attributes applies to the first application;
    assign an attribute score to the first application based on the determination;
    calculate an assessment point score based at least in part upon the attribute score;
    calculate a control point score based at least in part upon the assessment point score;

calculate a section score based at least in part upon the control point score;

calculate a chapter score based at least in part upon the section score; and determine a strength of the first application based at least in part upon at least one of the assessment point score, the control point score, the section score, and the chapter score.

9. The computer readable storage medium of claim 8, the logic further operable to:

determine one or more weak points of the first application based at least in part upon at least one of the assessment point score, the control point score, the section score, and the chapter score;

determine enhanced operational procedures to facilitate repairing the first application;

monitor at least one of the weak points of the first application;

determine that a failure trigger occurs in the first application; and in response to determining that the failure trigger occurs, perform the enhanced operational procedures to repair the first application.

10. The computer readable storage medium of claim 8, the logic further operable to:

compare the strength of the first application to a strength of a second application; and determine a failure point in an enterprise comprising the first application and the second application based on the comparison.

11. The computer readable storage medium of claim 8, the logic further operable to:

identify other applications of an enterprise that the first application interacts with;

determine an integration of the first application within the enterprise; and generate an architecture artifact to illustrate the integration of the first application within the enterprise.

12. The computer readable storage medium of claim 8, the logic further operable to:

generate a heat map comprising information corresponding to a plurality of chapter scores; and communicate the heat map for display to a user.

13. The computer readable storage medium of claim 8, the logic further operable to:

determine one or more weak points of the first application based at least in part upon at least one of the assessment point score, the control point score, the section score, and the chapter score; and generate a findings report based on the one or more weak points of the first application and the strength of the first application.

14. A method for application assessment, comprising:

storing, in a memory, a plurality of chapters, a plurality of sections each associated with a chapter, a plurality of control points each associated with a section, a plurality of assessment points each associated with a control point, and a plurality of attributes each associated with an assessment point;

retrieving, by an interface, application information corresponding to a first application;

determining, by a processor, whether one of the plurality of attributes applies to the first application;

assigning an attribute score to the first application based on the determination;

calculating, by the processor, an assessment point score based at least in part upon the attribute score;

calculating, by the processor, a control point score based at least in part upon the assessment point score;

calculating, by the processor, a section score based at least in part upon the control point score;

calculating, by the processor, a chapter score based at least in part upon the section score; and determining, by the processor, a strength of the first application based at least in part upon at least one of the assessment point score, the control point score, the section score, and the chapter score.

15. The method of claim 14, further comprising:

determining, by the processor, one or more weak points of the first application based at least in part upon at least one of the assessment point score, the control point score, the section score, and the chapter score;

determining, by the processor, enhanced operational procedures to facilitate repairing the first application;

monitoring, by the processor, at least one of the weak points of the first application;

determining, by the processor, that a failure trigger occurs in the first application; and in response to determining that the failure trigger occurs, performing, by the processor, the enhanced operational procedures to repair the first application.

16. The method of claim 14, further comprising:

comparing, by the processor, the strength of the first application to a strength of a second application; and determining, by the processor, a failure point in an enterprise comprising the first application and the second application based on the comparison.

17. The method of claim 14, further comprising:

identifying other applications of an enterprise that the first application interacts with;

determining, by the processor, an integration of the first application within the enterprise; and generating, by the processor, an architecture artifact to illustrate the integration of the first application within the enterprise.

18. The method of claim 14, further comprising:

generating, by the processor, a heat map comprising information corresponding to a plurality of chapter scores; and communicating, by the interface, the heat map for display to a user.

19. The method of claim 14, further comprising:

determining, by the processor, whether one of the plurality of attributes applies to the application comprises determining one of the plurality of attributes is not applicable to the application; and assigning an attribute score to the application comprises designating the one of the plurality of attributes as not applicable.

20. The method of claim 14, further comprising:

determining, by the processor, one or more weak points of the first application based at least in part upon at least one of the assessment point score, the control point score, the section score, and the chapter score; and generating, by the processor, a findings report based on the one or more weak points of the first application and the strength of the first application.

* * * * *